United States Patent [19]

Sheratte

[11] 4,110,266

[45] Aug. 29, 1978

[54] PROCESS FOR CONVERTING THE DECOMPOSITION PRODUCTS OF POLYURETHANE AND NOVEL COMPOSITIONS THEREBY OBTAINED

[75] Inventor: Martin B. Sheratte, Canoga Park, Calif.

[73] Assignee: McDonnell Douglas Corporation, Long Beach, Calif.

[21] Appl. No.: 703,807

[22] Filed: Jul. 9, 1976

[51] Int. Cl.$^2$ .................... C08J 11/00; C08G 18/00
[52] U.S. Cl. ........................... 260/2.3; 260/33.4 UR; 260/33.6 UB; 260/33.8 UB; 521/167; 528/78
[58] Field of Search ............ 260/2.3, 2.5 AQ, 2.5 BD, 260/77.5 AA, 77.5 AP, 77.5 B

[56] References Cited

U.S. PATENT DOCUMENTS

| | | | |
|---|---|---|---|
| 3,708,440 | 1/1973 | Frulla et al. ........................... | 260/2.3 |
| 3,719,615 | 3/1973 | Buisson et al. ................ | 260/2.5 AQ |
| 3,763,111 | 10/1973 | Fijal ................ | 260/2.5 AQ |

FOREIGN PATENT DOCUMENTS 224,935  12/1957  Australia ........................... 260/2.5 BD

*Primary Examiner*—Thomas DeBenedictis, Sr.
*Attorney, Agent, or Firm*—Max Geldin

[57] ABSTRACT

Decomposing polyurethane foams and converting the depolymerized reaction product containing amines, both aromatic and aliphatic, into polyols suitable for reaction with polyisocyanate to produce fresh polyurethane foam, by first reacting polyurethane foam with ammonia or an amine such as diethylene triamine or ethanolamine, or with a polyol such as polypropylene glycol, and reacting the resulting decomposition product containing a mixture of polyols, ureas, and amines, which can include primary and secondary amines, with an alkylene oxide such as ethylene oxide or propylene oxide, at elevated temperature, preferably about 120° to about 140° C, in an autoclave under autogenous pressure, to convert such amines to polyols. The resulting reaction mixture containing polyol fragments from the decomposition of the polyurethane, and additional polyols from the reaction with alkylene oxide can be incorporated with fresh polyurethane reactants, including polyisocyanate, or additional polyol and polyisocyanate, thus permitting efficient recovery and re-use of otherwise useless scrap polyurethane materials.

33 Claims, No Drawings

PROCESS FOR CONVERTING THE DECOMPOSITION PRODUCTS OF POLYURETHANE AND NOVEL COMPOSITIONS THEREBY OBTAINED

BACKGROUND OF THE INVENTION

This invention relates to recovery and re-use of scrap polyurethane, and is especially concerned with the provision of an efficient process for decomposing and dissolving polyurethane foams and converting the decomposition product into one which is more readily reactive with polyisocyanate to produce fresh polyurethane foam. More particularly, the invention relates to novel procedure for converting primary and secondary amines present in the above noted polyurethane decomposition product into polyols for reaction with polyisocyanate to produce urethane polymer, and to the novel product or mixture produced in such reactions.

Polyurethane foams and adhesives are extensively employed in industry at the present time. Thus, urethane polymers are employed throughout industry for the preparation of rigid, semi-rigid or soft polyurethane foam. Urethane polymers are produced basically by the reaction of a polyisocyanate, particularly diisocyanates, with hydroxyl-rich compounds containing at least two hydroxyl groups per molecule, such as glycols, polyesters, polyethers, and the like, or amine-rich compounds such as aromatic and aliphatic diamines and polyamines.

Since many urethane polymer foams are cross-linked, when preparing urethane polymer foam parts using for example metallic molds, it is particularly difficult to remove excess urethane polymer from such molds after formation of foam parts and removal thereof from the molds. Parting agents are frequently used in some industries for this purpose, and certain treating agents have heretofore been employed which soften the polyurethane foam so that excess foam on the mold can be more easily removed by hand. Treating agents of this type previously employed include superheated steam, N-methyl pyrrolidone, chlorinated hydrocarbons, and the like. However, in most applications, in spite of the use of such softening agents, some hand removal of the excess foam is necessary.

Further, the polyurethane foam manufacturing industry is known to discard millions of pounds of scrap foam annually in this country, with additional similarly substantial quantities being discarded world-wide, that is outside the United States. The chemicals contained in such scrap are lost, and no commercially successful recovery process for such chemicals has heretofore been devised.

Various procedures have been disclosed in the prior art in seeking to solve the problem of recovery of the chemicals in scrap urethane polymers. Thus, U.S. Pat. No. 2,937,151 discloses dissolving flexible polyurethane foams in liquid polyalkylene glycol ethers, polyesters or polyesteramides. U.S. Pat. No. 3,632,530 discloses decomposition of a polyurethane by heating in the presence of an aliphatic diol such as ethylene glycol, dipropylene glycol, and the like. However, in practice, methods for recovering scrap polyurethane based on degradation of the foams in the presence only of alcohol groups are excessively time consuming, even in the presence of catalysts, as taught in U.S. Pat. No. 3,300,417. An increased rate of dissolution of the scrap urethane foams was obtained in U.S. Pat. No. 3,117,940 by the use of primary amines in place of alcohols. U.S. Pat. No. 3,708,440 discloses the dissolution of isocyanurate foam in a mixture of diethylene glycol and diethanolamine. However, this process is too slow to be commercially useful. U.S. Pat. No. 3,404,103 discloses decomposing polyurethane in an amine of various types, such as an aliphatic amine, e.g. monoethanolamine, and an alkali metal oxide or alkali metal hydroxide such as sodium hydroxide, to obtain an amine derivative and a polyether, and separating the polyether from the amine derivative and employing the polyether for production of urethane polymer.

In essentially all of the various prior art procedures noted above, the decomposition of the polyurethane yields a mixture of polyols, aromatic and aliphatic ureas, and aromatic and aliphatic amines, and occasionally some soluble urethane fragments. Experience has shown that the presence of aromatic and aliphatic amine groups in the product mixture following decomposition of the polyurethane foam is detrimental to the formation of fresh useable foam because amine groups, that is primary and secondary amine groups, are much more reactive toward isocyanates than are alcohol groups contained on the polyols, the main desirable constituent for reaction with polyisocyanate. This excess reactivity of such amines can be modulated by incorporating only a small amount of the recovered decomposition product from polyurethane in the new foam formulation, making up the difference with commercial polyol. Unfortunately, such a procedure loses much of the commercial potential for re-use of the decomposition product to produce fresh polymer. Alternatively, the polyurethanes may be completely solvolyzed and the so-formed amines separated by distillation. Thus, for example in above noted U.S. Pat. No. 3,404,103, following decomposition of the polyurethane, the amine derivative is separated from the polyether by distillation, the polyether then being re-used for production of fresh urethane polymer. Although this latter procedure results in production of useable polyurethane decomposition products for producing fresh foam, it is undesirably expensive from the standpoint of additional energy costs and labor.

It is an object of the present invention to provide novel procedure for readily decomposing polyurethane, and to convert the decomposition product into a more efficient novel material or product for reaction with polyisocyanate to produce fresh urethane polymer. Another object is to provide procedure of the above noted type wherein certain components of the decomposition product, notably amines containing active hydrogen, such as primary and secondary amines, are converted into useable polyol, to augment the polyol formed during decomposition, for subsequent reaction with polyisocyanate to produce fresh foam.

DESCRIPTION OF THE INVENTION

The above objects are achieved according to the invention by converting the excessively reactive aliphatic and aromatic amines containing active hydrogen, i.e. primary and/or secondary amines, present in the decomposition product of polyurethane, into polyols by reaction with an alkylene oxide, as defined more specifically hereinafter. The reaction between such amines present in the decomposition product and alkylene oxide yields polyols which are much less reactive than the parent amine, and consequently are suitable for reaction directly with polyisocyanate for production of fresh polyurethane foams.

According to the invention process, the entire product mixture following decomposition of the polyurethane, e.g. with polyol, amine or ammonia as decomposing agent, is treated preferably with an excess of an alkylene oxide, e.g. propylene oxide, in an autoclave under autogenous pressure and at elevated temperature preferably ranging from about 120° to about 140° C for a suitable period which can range, for example, from about one to about three hours. It is necessary either to completely solvolyze the foam, that is to completely depolymerize the foam, or to separate the amines from the remainder of the mixture, as is done in above U.S. Pat. No. 3,404,103. By this procedure, all of the amine groups in the above polyurethane decomposition mixture, consisting essentially of primary and secondary amine groups, are converted into polyols. This includes not only aliphatic and aromatic primary and secondary amines, but also primary and secondary amine groups attached to solubilized urethane fragments and to ureas including polyureas, and even to such amine groups on any excess solvent, such as alkanolamine, which may be present in the polyurethane decomposition mixture.

The basic reaction for the conversion of the primary amines to polyols according to the present invention can be illustrated as follows:

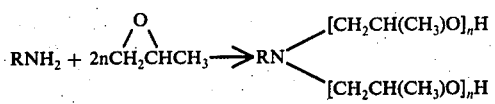

where $n = 1$ to 3. A similar reaction occurs with secondary amines, except that only one reactive hydrogen of such amines is replaced by a polyol group as shown in the above reaction. It is seen that the polyol reaction products are also tertiary amines.

The yield of polyol product of the above reaction is essentially quantitative. Thus, an essentially 100% recovery of the scrap polyurethane material can be obtained, for example, by dissolving the scrap polyurethane in an amine solvent, and then causing the entire solution to react with an alkylene oxide so that all amine groups present are converted to alcohol groups. Thus, the entire reaction product, including the amine used for the solvent, can be converted to a mixture of polyols, substantially the same as those polyols which are employed as the major components of polyurethane foam. Accordingly, by the appropriate choice of solvent or decomposing agent for the scrap polyurethane, alkylene oxide, and reaction conditions, a product is obtained which may be used as the entire polyol constituent for reaction with polyisocyanate for production of fresh polyurethane foam.

The initial urethane polymers, which are decomposed, as previously noted, are produced by reaction of polyisocyanates, particularly diisocyanates with, for example, suitable organic polyfunctional polyol reactants. A wide variety of organic diisocyanates can be used, among which are included aromatic diisocyanates, such as m-phenylene diisocyanate, p-phenylene diisocyanate, 4-t-butyl-m-phenylene diisocyanate, 4-methoxy-m-phenylene diisocyanate, 4-phenoxy-m-phenylene diisocyanate, 4-chloro-m-phenylene diisocyanate, toluene diisocyanates (either as a mixture of isomers, e.g., the commercially available mixture of 80% 2,4-toluene diisocyanate and 20% 2,6-toluene diisocyanate, or as the individual isomers themselves), polyphenyl polymethylene polyisocyanate, corresponding to the material marketed as PAPI, and other polyisocyanates.

The most important hydrogen-rich reactants for reaction with the polyisocyanates to produce polyurethanes are hydroxyl-containing compounds such as the glycols, polyols, hydroxyl-rich polyesters and various polyethers. These include diols or polyols such as polypropylene glycol, tetramethylene glycol and its polymers, trimethylol propane and the like.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol propane, pentaerythritol, dipentaerythritol, sucrose, sorbitol and the like, or amines such as ethanolamine, ethylene diamine, diethylene triamine, and the like, with lower alkylene oxides such as ethylene oxide, propylene oxide and the like.

Polyesters containing a plurality of isocyanate-reactive hydroxyl groups constitute another class of reactive organic polyfunctional polyols which may be employed in preparing polyurethane resins. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, and the like, acids.

The urethane polymerization reaction is usually base catalyzed, although free-radical generating catalysts can also be employed, and employing proportions of the isocyanate and polyol components so as to obtain an equivalent number of hydroxyl and isocyanate groups.

Modifications can be made in the polyurethane reaction mixture to provide resins having various degrees of flexibility, rigidity and other properties as is well known in the art. These include varying the mol ratio of polyisocyanate to polyol and in employing tri- or higher functional polyols and polyisocyanates.

The reactants and reaction for producing polyurethanes of varying properties is well known in the art and further detailed description thereof is believed unnecessary.

The materials used to decompose urethane polymers, e.g. in the form of both rigid and flexible foams can be any of the decomposing agents employed in the prior art, as exemplified by the above noted patents. Thus, such materials can include glycols, polyols, polyethers and amines including aliphatic and aromatic monoamines and polyamines, cycloaliphatic amines and heterocyclic amines, and alkanolamines, and also ammonia and ammonium hydroxide.

Examples of glycols, polyols and polyethers are ethylene glycol, propylene glycol, polyethylene glycols, and polypropylene glycols of molecular weight about 130 to about 5,000, e.g. dipropylene glycol, copolymers of ethylene glycol and propylene glycol, adducts of propylene oxide and ethylene diamine or sorbitol, adducts of pentaerythritol with an alkylene oxide such as propylene oxide, and adducts of trimethylol propane with an alkylene oxide, e.g. the adduct of trimethol propane with propylene oxide, polyethylene oxide or polypropylene oxide, and the like. Other suitable urethane polymer decomposing agents which can be employed include monoalcohols such as n-butanol, pentanol and hexanol, and polyalcohols such as glycerol, trimethylol propane and pentaerythritol. Also, materials such as phenol, e.g. resorcinol and o-, m- and p-cresols, or mixtures thereof such as cresylic acid, are suitable.

Examples of aliphatic and aromatic monoamines which can be employed include methylamine, dimethylamine, butylamine, dibutylamine, tridecylamine, aniline, methyl aniline, ortho- and para-toluidine, and the like. Examples of aliphatic and aromatic polyamines which can be employed include ethylene diamine, diethylene triamine, triethylene tetramine, tetraethylene pentamine, hexamethylene diamine, and phenylene diamines such as diamino benzene, diamino toluene, methylene dianiline, and the like. Examples of alkanolamines which can be employed include ethanolamine, N-methyl ethanolamine, diethanolamine, triethanolamine, propanolamine, dipropranolamine. Cycolaliphatic amines such as cyclohexylamine and piperidine can be employed and heterocyclic amines such as pyridine, alpha and beta picoline, and N-ethylmorpholine also can be used.

As previously noted, ammonia or ammonium hydroxide also can be used for decomposing the polyurethane. Although ammonia or ammonium hydroxide can be used in the absence of any solvents, in preferred practice, the ammonia or ammonium hydroxide is employed in combination with a suitable solvent, such as any of the glycols, polyols and polyethers noted above.

If desired, the above noted glycols, polyols and polyethers, can be employed in combination with any of the above noted amines, such as a combination of diethanolamine and triethylene glycol, triethylene tetramine and trimethylol propane, and tetraethylene pentamine and triethylene glycol.

There can also be incorporated in the above noted decomposing agent for the polyurethane, e.g. glycol, polyol, polyether or amine, small amounts of a strong base or alkali, such as the oxides, hydroxides, alkoxides, phenoxides and thiophenoxides of the alkali and alkaline earth metals, such as sodium hydroxide, potassium methoxide, calcium hydroxide, barium oxide, lithium ethoxide, sodium phenoxide, sodium thiophenoxide, and the like.

Treatment of the urethane polymer for decomposition thereof with a decomposing agent as described above, such as polyol, amine or ammonia is generally carried out at elevated temperature, e.g. ranging from about 100° to 300° C and preferably between about 150° and 250° C, and most desirably between about 150° and about 230° C in the case of ammonia. The reaction can be carried out at ambient pressure in the presence of air, or the reaction can be carried out within the above temperature ranges under autogenous pressure in a sealed vessel such as an autoclave. However, in the case of flexible urethane polymers, such polymers can be treated and decomposed at ambient temperature. Treatment of the urethane polymer and polyol or other suitable reactant at elevated temperature in an autoclave has the advantages of the absence of air, resulting in less oxidation, particularly of the amines formed during depolymerization in the reaction mixture, and also permits feeding of larger amounts of urethane foam to be treated with a given amount of solvent over a given time, thus increasing the capacity and facilitating commercial operations.

The time of treatment of the urethane polymer for decomposition thereof with the above noted decomposing agents such as polyol, ammonia or amine, depends on the particular decomposing agent employed, the temperature of treatment, pressure, and how extensively it is desired to depolymerize the urethane foam. Thus, time of treatment can range from as little as about 10 seconds up to about 3 hours or more, and usually ranges from about 1 to about 15 minutes.

As previously noted, where ammonia or ammonium hydroxide is employed as decomposing agent, it is utilized preferably in combination with a suitable solvent, which can be for example any of the glycols, polyols or polyethers noted above. Thus, a small amount of glycol or polyol can be heated to temperature within the ranges noted above, and gaseous ammonia bubbled through the hot liquid, and the urethane foam then added to the ammoniacal liquid. Alternatively, concentrated ammonium hydroxide, e.g. 30% concentration, can be introduced into a solvent of the types described above, such as a glycol or polyol and the urethane foam then treated with such solution. The concentration of ammonia or ammonium hydroxide in the solvent can range from about 0.1 to about 40% by weight, and the proportion of ammonia or ammonium hydroxide, to the polyurethane foam, can range from about 0.1 to about 30% by weight. Where alkali is employed together with polyol or equivalent reagent hereof, the concentration of alkali present can range from about 0.01 to about 5%, preferably about 0.01 to about 2%, the balance being the polyol or equivalent reagent. Water can also be employed in combination with alkali in such mixtures, e.g. in a concentration of about 1 to about 10% by weight.

As previously noted, during treatment of the urethane polymer with the decomposing agent, e.g. polyol, amine or ammonia, a reaction occurs which is of a nature not entirely known, causing the urethane polymer to depolymerize. The products of such depolymerization of the urethane polymer dissolve in excess of the reagent to yield a clear solution which is frequently water or alcohol soluble. As more foam is decomposed, the complex polyol/amine/urea mixture acts as solvent for the reaction and for the decomposition products of the foam.

The reaction mixture obtained by decomposition and depolymerization of the polyurethane by means of a decomposing agent as previously set forth, contains polyols, ureas, both aliphatic and aromatic, aliphatic and aromatic amines, which can include primary and/or secondary amines, and any excess decomposing agent or solvent, and may also contain some soluble urethane fragments. The amines present in the decomposition mixture can be essentially primary amines but frequently can be a mixture of both primary and secondary amines, depending on the choice of decomposition agent employed. Examples of such primary amines are methylene dianiline, diamino toluene, ethanolamine, aniline, and the like. Examples of such secondary amines are diethylene triamine, diethanolamine, triethylene tetramine, and the like. It is understood that the above specific amines are only exemplary, and other primary and secondary amines can be present. The urethane polymer decomposition mixture can contain from about about 15 to about 90% total amines containing active hydrogen, but the presence of such amines containing either or both primary and secondary amine groups, is detrimental to the formation of a useable fresh foam because of the high reactivity of such amine groups toward isocyanates, as compared to hydroxyl groups.

Tertiary amines can also be present in the decomposition reaction mixture but they do not affect the reaction of the polyols in such mixture with polyisocyanate, the presence and amount of such tertiary amine depending on whether any tertiary amine polyol was used in the manufacture of the urethane foam.

According to the invention, the reactive amine groups of substantially the entire amine content of the polyurethane decomposition product are converted into polyols by reaction with an alkylene oxide. Such reaction can be carried out in the absence of any additional solvent, but in many instances it has been found advantageous to add solvent to the decomposition product prior to reaction with alkylene oxide, to facilitate the reaction, e.g. to reduce the viscosity of the decomposition product mixture. As suitable solvents for this purpose, are organic compounds having a boiling point greater than about 120° C, and preferably greater than about 150° C. Such solvents include amines carrying at least one primary or secondary amine group, and can be aliphatic or aromatic amines. If the amines employed as solvent in the reaction have 8 or more than 8 carbon atoms, and only one amine group, they will have suitable boiling points. If such amines have more than one amine group, or one hydroxyl group in addition to the amine group, such amines can have as few as 2 carbon atoms. Examples of such amine solvents which can be employed include ethanolamine, ethylene diamine, diethylene triamine, triethylene tetramine and aliphatic monoamines such as dibutyl amine, dihexyl amine, and octyl amine, and aromatic amines such as diamino toluene, methylene dianiline and bis anilino xylyl amine. Other suitable solvents are diethanolamine, propanolamine, dipropanolamine, and the like.

Any suitable alkylene oxide or mixtures thereof can be employed for reaction with the amines of the decomposition mixture. The alkylene oxide employed can contain an alkylene group of from 2 to about 7 carbon atoms, and such alkylene groups can be derived from aliphatic and cycloaliphatic chains, and can carry substituents such as aryl groups. Examples of suitable alkylene oxides which can be used according to the present invention include ethylene oxide, propylene oxide, butylene oxide, pentene oxide, hexylene oxide, styrene oxide, epichlorohydrin, trichlorobutylene oxide, and the like.

The amount of alkylene oxide employed is preferably in excess of the amount reqired to convert all of the amines present in the mixture to polyols. That is, an excess of alkylene oxide is employed with respect to active hydrogen atom of the amines present. Thus, more than one mole of alkylene oxide, such as propylene oxide, is employed per mole of active hydrogen atom of the amines. In preferred practice, more than one and up to about 3 moles of alkylene oxide is employed per mole of active hydrogen atom of the amines present.

The reaction of the polyurethane decomposition product and alkylene oxide is carried out under autogenous pressure which can range from about 25 to about 200 psi, usually between about 25 and about 35 psi. Temperature of the reaction can range from about 100° to about 180° C, preferably between about 120° and about 140° C. Time of reaction can range from as little as 20 minutes to about 3 hours, usually from about 1 to about 3 hours.

During the reaction, all of the amine groups in the mixture are converted into polyols, including amine groups attached to solubilized urethane fragments, polyureas, aliphatic and aromatic amines, and also amine groups on any amine solvent which may be present.

If, after the reaction, it is desired to extend the alkylene oxide chain of the resulting polyols, the autoclave can be opened and catalyst added. Such catalyst can be a tertiary amine, such as tetramethyl ethylene diamine, tributyl amine or tetramethyl butane diamine, or an alkali metal hydroxide such as potassium hydroxide. The extension of the alkylene oxide chain functions to decrease the hydroxyl number of the polyol product, so as to produce a less friable foam.

The resulting reaction mixture produced by decomposition of polyurethane foam and reaction of the decomposition product with alkylene oxide according to the invention contains an increased polyol content over the amount of polyol present in the initial decomposition product. Such mixture following reaction with alkylene oxide is substantially free of primary or secondary amines, and consists essentially entirely of a mixture of various polyols, certain of such polyols corresponding to those employed in the initial reaction for producing the polyurethane foam, and described above, such as NIAX-BE 375, a propoxylated novolac, NIAX LA 475, a propoxylated diethylene triamine, and the like. Other polyols which can be present in the reaction product arise from reaction of amine-containing fragments from the urethane foam with alkylene oxide, e.g. propylene oxide, such as the reaction product of alkylene oxide with methylene dianiline, diamino toluene, and the like. Still other polyols arise by alkoxylation of ureas formed in the urethane polymer decomposition reaction. Other polyols which can be present arise through partial transesterification reactions of the original cross linked urethane molecules, and also arise by alkoxylation of decomposition reagent, such as the alkoxylation product of diethylene triamine, ethanolamine, and the like. By appropriate choice of solvent, alkylene oxide and reaction conditions, such reaction product can be employed as the entire polyol constituent for subsequent reaction with polyisocyanate to produce fresh urethane foam, or such product can be mixed with additional suitable polyols, as the active hydrogen-containing fraction, for reaction with polyisocyanate to produce new foam. These materials are caused to react, in known manner, as described above, with suitable polyisocyanates such as 2,4- and 2,6- toluene diisocyanates, or mixtures thereof, and polyphenyl polymethylene polyisocyanate, to produce polyurethane foam.

The following are examples of practice of the invention:

EXAMPLE 1

Approximately 100 grams of a rigid urethane foam was dissolved in 30 grams ethanolamine. Excess ethanolamine was stripped out, leaving a clear solution which was shown by infrared and gel-permeation chromatography analysis, to contain some residual urethane, aromatic polyurea, aliphatic polyols, aromatic amines and N,N'-bis-($\beta$-hydroxyethyl) urea. The mixture was dissolved in 45 grams propylene oxide and heated at 120° C in an autoclave for 2 hours. The pressure rose to 40 psi and then fell to 30 psi by the end of the 2 hour heating period. The product was clear stiff brown oil with hydroxyl number 485. It was incorporated into the following formulation.

|  | Grams |
|---|---|
| Above Product | 15 |
| Mondur MR - an aromatic polyisocyanate | 14 |
| Diethyl Ether | 10 |
| Dibutyl Tin Di(2-Ethylhexoate) | 0.01 |

The mixture had a cream time of 20 seconds, a rise time of 60 seconds, and a tack free time of about 85 seconds. The product had entirely acceptable properties for a rigid foam.

EXAMPLE 2

100 grams of a commercial isocyanurate foam of unknown composition was crushed into a 250 cc stainless steel pressure vessel. The vessel was sealed and connected to a gaseous ammonia cylinder. Ammonia was admitted and a pressure of 100 psi was maintained while the vessel was immersed in an oil bath at 180° C for 2 hours, with occasional rocking. The product was a viscous dark brown oil (103 grams) which had a hydroxyl number 820.

5 grams ethylene diamine and 100 grams propylene oxide were added to the vessel, which was again sealed and heated to 100°-120° C for three hours. At the end of this time, excess propylene oxide was stripped out, leaving a brown oil with hydroxyl number 520 and a room temperature viscosity of 1200 cs.

EXAMPLE 3

The procedure of Example 2 was repeated using 10 cc concentrated aqueous $NH_4OH$ (30% $NH_4OH$) in place of ammonia. The results were essentially the same as in Example 2.

EXAMPLE 4

20 grams of a commercial rigid urethane foam of unknown composition was dissolved in 40 cc diethylene triamine at 200° C, within 5 minutes. The excess diethylene triamine was stripped out under vacuum, and the resultant stiff brown oil (28.5 grams) was mixed with 20 grams propylene oxide. The mixture was heated in a stainless steel autoclave to 125° C under autogenous pressure for a period of 3 hours. At this time, the autoclave was opened and 0.2 gram potassium hydroxide dissolved in 0.5 gram water was added. The water was stripped out under vacuum, and 40 grams propylene oxide was added. The autoclave was again sealed and heated to 125° C for 5 hours. The product was dissolved in methanol and treated with Ionac C-242 acid ionic exchange resin to remove catalyst. The methanol was stripped out under vacuum. The product (85 grams) was a stiff brown oil with hydroxyl number 580.

EXAMPLE 5

A commercial rigid urethane foam of unknown composition was dissolved in ethanolamine, and the excess solvent was stripped out under vacuum. 15 grams of the product was mixed with 5 grams ethylene diamine and 30 grams propylene oxide, and heated at 125° C in a stainless steel autoclave under autogenous pressure for 3 hours. The autoclave was then opened and a solution of 0.2 gram potassium hydroxide in 0.5 cc water was added. The water was stripped out under vacuum, and then 30 grams propylene oxide was added. The autoclave was sealed and again heated at 125° C for 5 hours. After removal of the catalyst, the product weighed 80 grams and had hydroxyl number 450.

EXAMPLE 6

50 grams ethylene glycol was placed in a 500 cc flask equipped with a stirrer, thermometer, gas inlet tube and a short reflux condenser. The glycol was heated to reflux temperature (200° C) and a slow stream of ammonia gas was admitted through the inlet tube. A mixture of 4 different commercial rigid urethane foams was added through the condenser to the flask. The foams dissolved, slowly at first, and then more rapidly as foam decomposition products accumulated in the flask. When a total of 300 grams foam has been added (about 2½ hours), the addition was interrupted, and 200 grams of product was removed from the flask. Addition of foam was continued until a further 220 grams had been added (1½ hours). The addition was again interrupted and 200 grams product was removed. This process was repeated several times over a period of 3 days. Eventually, the product material removed each time set to a dark colored glass, melting at 50°-80° C to a mobile fluid.

80 grams of this final decomposition product were placed in a stainless steel autoclave together with 20 grams propylene oxide. The autoclave was sealed and heated to 130° C for 3 hours. The product at this time was a very stiff dark brown oil with hydroxyl number about 750. Potassium hydroxide was added as catalyst, and a further 30 grams propylene oxide were caused to react over a period of 5 hours at 125° C. The final stiff oily product weighed 128 grams and had hydroxyl number 520, after removal of catalyst.

EXAMPLE 7

40 grams of the final urethane foam decomposition product from Example 6 were mixed with 10 grams ethylene diamine and 50 grams propylene oxide, and heated under autogenous pressure for 3 hours.

At the end of this time, the autoclave was opened, the mixture was catalyzed with potassium hydroxide, and a further 60 grams propylene oxide was added. Heating was continued for 6 hours. The product was a stiff brown oil with hydroxyl number 485.

EXAMPLE 8

The product from Example 7 was incorporated into the following foam formulation:

|  | Grams |
|---|---|
| Product of Example 7 | 20 |
| Freon 11 | 5 |
| Dibutyl Tin Dilaurate | 0.4 |
| DC 193 Silicone Surfactant | 0.4 |
| PAPI 105 index (polyisocyanate) | 29.5 |

The mixture had a cream time of 25 seconds, and set tack free after 4 minutes to a rigid foam with density 2.15 lb/ft$^3$. The material had mechanical properties typical of foams in this density range.

EXAMPLE 9

100 grams pentaerythritol were charged to a 1000 cc flask equipped with a stirrer, thermometer, gas inlet tube and a short reflux condenser. A mixture of 150 grams of each of four commercial rigid urethane foams of unknown composition was added to the flask over a period of 3 hours, while a slow stream of ammonia was bubbled through the flask, and the contents were heated to 210°–220° C.

When the foam had all dissolved (about 3¼ hours), the product was cooled, poured into a 2000 cc stainless steel autoclave and mixed with 400 grams propylene oxide. The autoclave was sealed and heated at 130° C for 3 hours. At the end of this time, the autoclave was opened, and 0.5 gram potassium hydroxide dissolved in 1.5 gram water was introduced. The water was stripped out under vacuum, and the autoclave was resealed and heated to 125° C. Propylene oxide was bled into the stirred reaction mixture until 800 grams propylene oxide had been absorbed. The reaction product was dissolved in methanol and treated with Ionac C-242 ion exchange resin to remove the catalyst. Removal of the methanol left an oil with hydroxyl number 565.

EXAMPLE 10

The product from Example 9 was incorporated into the following foam formulation:

|  | Grams |
| --- | --- |
| Product from Example 9 | 80 |
| Dibutyl tin dilaurate | 1.0 |
| NIAX BE-375 (polyol) | 20 |
| DC 193 Surfactant | 1.5 |
| PAPI 105 index (polyisocyanate) | 94 |
| Freon 11 | 30 |

The NIAX BE-375 is a commercial polyol, believed to be a propylene oxide adduct of a novolac. The mixture exhibited a cream time of 25 seconds, and set tack free in 3 minutes to a rigid foam with density 2.15 lb/ft³, and excellent mechanical properties.

EXAMPLE 11

A 1 liter resin pot was equipped with a thermometer, stirrer, a short air condenser, and a spigot at the bottom through which the contents of the pot could be withdrawn.

The pot was charged with 300 grams ethanolamine, which was heated to 170° C (reflux temperature). Small pieces of commercial rigid foam of unknown composition were introduced through the condenser while the ethanolamine was stirred. The foam dissolved quite rapidly, and 500 grams foam were dissolved in this way in about 15 minutes. At this stage, the contents of the pot were withdrawn through the spigot at a rate of 80 cc per minute, while at the same time fresh ethanolamine was added through the condenser at a rate of 30 cc per minute, and foam was added at a rate of 50 grams per minute. Enough heat was supplied to maintain the temperature at 170°–180° C.

When operated in this way, the reactor was able to dissolve 6.5 to 7 lbs to foam per hour indefinitely.

100 grams of the resulting solution were stripped of excess ethanolamine. Approximately 10 grams of such solvent was recovered. The remaining 90 grams of product was caused to react with 35 grams propylene oxide in a sealed steel vessel at 120°–140° C. The reaction was complete in three hours, and the product, which weighed 122 grams, was a brown oil with room temperature viscosity approximately 800 cps and a hydroxyl number of 580.

The resulting product was used with the following formulation to prepare a rigid urethane foam:

|  | Grams |
| --- | --- |
| Product | 25 |
| Mondur MR | 41 |
| Silicone Surfactant (DC193) | 0.15 |
| Dibutyl Tin Dilaurate | 0.15 |
| Freon 11 | 8.0 |

The foam had a density of 2.2 lbs/cubic foot, and exhibited mechanical properties typical of commercial rigid foams in this density range.

EXAMPLE 12

Commercial rigid foams were decomposed and dissolved in a number of amine decomposing agents or solvents according to the procedure of Example 11. The respective solvents were stripped out, together with N,N'-dioctylurea, and the resulting products were caused to react with propylene oxide in accordance with the procedure of Example 11. The hydroxyl number of the resultant polyol for each solvent used is shown in the table below.

| Solvent | Foam To Solvent Weight Ratio | Temperature °C | LBS Foam/ Hour | Product Hydroxyl Number |
| --- | --- | --- | --- | --- |
| Diethylene Triamine | 7:2 | 200 | 8.2 | 610 |
| Triethylene Tetramine | 7:2 | 210 | 7.9 | 620 |
| Octylamine | 5:3 | 165 | 4 | 560 |

Each of the above polyol products was blended with Freon 11, dibutyl tin dilaurate, and a silicone surfactant (DC 193) and formulated into a foam with a commercial polyaromatic polyisocyanate. The foams in all instances possessed excellent mechanical properties.

EXAMPLE 13

20 grams of the foam prepared in Example 11 were dissolved in 8 grams ethanolamine. The product of this reaction (including some residual ethanolamine) was caused to react with propylene oxide according to the procedure of Example 11. The resultant polyol had hydroxyl number 585. It was incorporated into the following foam formulation:

|  | Grams |
| --- | --- |
| Above Product | 35 |
| Mondur MR | 59 |
| Silicone DC 193 | 0.15 |
| Dibutyl Tin Dilaurate | 0.1 |
| Freon 11 | 12 |

The resultant foam exhibited typical mechanical properties for a 2.5 lb/ft³ foam.

EXAMPLE 14

100 grams of a rigid commercial urethane foam of unknown composition was compressed into a 1000 cc pressure reaction vessel, to which 100 grams ethylene diamine was added. The vessel was sealed and heated to 170° C for 30 minutes. It was then cooled to 120° C, and ethylene oxide was bled in until no more would react.

The product was a brown oil with viscosity 2000 cps at room temperature and a hydroxyl number of 560. The yield was 515 grams.

EXAMPLE 15

250 grams of a rigid urethane foam was treated with 250 grams propylene glycol at reflux temperature (187° C) in the presence of slow stream of ammonia. The foam dissolved within one hour. The brown oil was mixed with 100 grams pentaerythritol and 2 grams of potassium hydroxide was added. The mixture was treated with 700 grams butylene oxide-1,2 at 130° C in a sealed 2000 cc pressure reaction vessel. After 4 hours, the product was a brown oil with hydroxyl number 420, and a viscosity of 5000 cps at room temperature. The yield was almost quantitative.

From the foregoing, it is seen that the invention provides novel and efficient procedure for completely decomposing urethane polymer, e.g. scrap or excess urethane polymer from metallic molds after formation of urethane polymer foam parts, by treatment of the polyurethane foam with a decomposing agent such as a glycol, polyol, amine or ammonia, to provide a product mixture containing aromatic and aliphatic amines containing active hydrogen, and reacting the resulting decomposition product with an alkylene oxide such as propylene oxide, to convert such amines in such product to a novel reaction mixture which is substantially free of primary and secondary amines and contains an increased amount of polyol as a result of such conversion reaction, thereby avoiding the necessity for the removal of amines prior to reaction of the final product with polyisocyanate to produce fresh urethane polymer, thus facilitating the latter reaction and improving the efficiency and economics thereof.

While I have described particular embodiments of my invention for purposes of illustration, it will be understood that various changes and modifications within the spirit of the invention can be made, and the invention is not to be taken as limited except by the scope of the appended claims.

What is claimed is:

1. A process for decomposing polyurethane and converting the depolymerized decomposition mixture into a product substantially free of primary and secondary amines and containing an increased amount of polyols suitable for reaction with polyisocyanate for producing fresh polyurethane foam, which comprises reacting a polyurethane foam with a decomposing agent at elevated temperature, and forming a depolymerized decomposition mixture containing polyols, ureas and a member selected from the group consisting of primary and secondary amines, and mixtures thereof, and reacting said decomposition mixture with alkylene oxide, employing an excess of alkylene oxide with respect to active hydrogen atoms of the amines, at elevated temperature ranging from about 100° to about 180° C and at elevated pressure, for a period sufficient to convert said amines to polyols, and forming a product mixture having an increased amount of polyols, as compared to said decomposition mixture, and substantially free of primary and secondary amines.

2. The process as defined in claim 1, said decomposing agent for said polyurethane foam being selected from the group consisting of glycols, polyols, polyethers, amines and ammonia, and said foam decomposing reaction carried out at elevated temperature ranging from about 100° to about 300° C.

3. The process as defined in claim 2, said temperature of said last mentioned reaction ranging from about 120° to about 140° C. at autogenous pressure and for a period ranging from about 15 minutes to about 3 hours.

4. The process as defined in claim 2, said excess alkylene oxide ranging from more than 1 to about 3 moles of alkylene oxide per mole of active hydrogen atom of the amines present in said decomposition mixture.

5. The process as defined in claim 4, said alkylene oxide containing an alkylene group of from about 2 to about 7 carbon atoms.

6. The process as defined in claim 5, said temperature of said last mentioned reaction ranging from about 120° to about 140° C at autogenous pressure ranging from about 25 to about 200 psi and for a period ranging from about 1 to about 3 hours.

7. The process as defined in claim 6, said alkylene oxide being selected from the group consisting of ethylene oxide, propylene oxide, butylene oxide, pentene oxide, hexylene oxide, cyclohexene oxide, styrene oxide, epichlorohydren and trichlorobutylene oxide.

8. The process as defined in claim 1, said amines in said decomposition mixture including aliphatic and aromatic amines.

9. The process as defined in claim 1, employing a glycol as decomposing agent for said polyurethane, said first mentioned elevated temperature ranging from about 150° to about 250° C.

10. The process as defined in claim 1, employing an amine as decomposing agent, said first mentioned elevated temperature ranging from about 150° to about 250° C.

11. The process as defined in claim 10, said amine employed as decomposing agent being an alkanolamine.

12. The process as defined in claim 1, employing as decomposing agent, ammonia or ammonium hydroxide, said first mentioned elevated temperature ranging from about 100° to about 300° C.

13. The process as defined in claim 10, said amine decomposing agent being employed in combination with a solvent selected from the group consisting of a glycol, polyol or polyether.

14. The process as defined in claim 6, employing ammonia or concentrated ammonium hydroxide as decomposing agent, in a solvent selected from the group consisting of a glycol, polyol and polyether solvent, said first mentioned elevated temperature ranging from about 150° to about 230° C.

15. The process as defined in claim 14, the concentration of ammonia or ammonium hydroxide ranging from about 0.1 to about 40% by weight of solution, the proportion of ammonia or ammonium hydroxide to polyurethane ranging from about 0.1 to about 30% by weight.

16. The process as defined in claim 6, employing a glycol as decomposing agent, said first mentioned elevated temperature ranging from about 150° to about 250° C.

17. The process as defined in claim 6, employing an amine as decomposing agent, said first mentioned elevated temperature ranging from about 150° to about 250° C.

18. The process as defined in claim 6, employing as decomposing agent, ammonia or ammonium hydroxide, said first mentioned elevated temperature ranging from about 150° to about 250° C.

19. The process as defined in claim 17, said amine decomposing agent being employed in combination with a solvent selected from the group consisting of a glycol, polyol or polyether.

20. The process as defined in claim 7, employing ammonia or concentrated ammonium hydroxide as decomposing agent, in a solvent selected from the group consisting of a glycol, polyol and polyether solvent, said first mentioned elevated temperature ranging from about 150° to about 230° C.

21. The process as defined in claim 20, the concentration of ammonia or ammonium hydroxide ranging from about 0.1 to about 40% by weight of solution, the proportion of ammonia or ammonium hydroxide to polyurethane ranging from about 0.1 to about 30% by weight.

22. A process for decomposing polyurethane and converting the depolymerized decomposition mixture into a product substantially free of primary and secondary amines and containing an increased amount of polyols suitable for reaction with polyisocyanate for producing fresh polyurethane foam, which comprises reacting a polyurethane foam with a decomposing agent at elevated temperature, completely liquefying said polyurethane and forming a depolymerized decomposition mixture containing polyols, ureas and a member selected from the group consisting of primary and secondary amines, and mixtures thereof, and reacting said decomposition mixture with alkylene oxide, employing an excess of alkylene oxide with respect to active hydrogen atoms of the amines, at elevated temperature ranging from about 100° to about 180° C and at elevated pressure, for a period sufficient to convert said amines to polyols, and forming a product mixture having an increased amount of polyols, as compared to said decomposition mixture, and substantially free of primary and secondary amines.

23. The process as defined in claim 12, said ammonia or ammonium hydroxide decomposing agent being employed in combination with a solvent selected from the group consisting of a glycol, polyol or polyether.

24. The process as defined in claim 1, including adding a solvent to said decomposition mixture prior to reaction with said alkylene oxide, said solvent being an organic compound having a boiling point greater than about 120° C.

25. The process as defined in claim 24, said solvent being an amine carrying at least one primary or secondary amine group.

26. The process as defined in claim 25, said amine solvent being selected from the group consisting of ethanolamine, ethylene diamine, diethylene triamine, triethylene tetramine, dibutyl amine, dihexyl amine, octyl amine, diamino toluene, methylene dianiline, bis anilino xylyl amine, diethanolamine, propanolamine and dipropanolamine.

27. The process as defined in claim 1, including extending the alkylene oxide chain of the resulting polyols in said product mixture by addition of a catalyst to said product mixture.

28. The process as defined in claim 27, said catalyst being a tertiary amine or an alkali metal hydroxide.

29. The process as defined in claim 28, said catalyst being a tertiary amine selected from the group consisting of tetramethyl ethylene diamine, tributyl amine and tetramethyl butane diamine.

30. A process for decomposing polyurethane and converting the depolymerized decomposition mixture into a product substantially free of primary and secondary amines and containing an increased amount of polyols suitable for reaction with polyisocyanate for producing fresh polyurethane foam, which comprises reacting a polyurethane foam with a decomposing agent at elevated temperature, and forming a depolymerized decomposition mixture containing polyols, ureas and a member selected from the group consisting of primary and secondary amines, and mixtures thereof, and reacting said decomposition mixture with an alkylene oxide at elevated temperature and pressure, and converting said amines to polyols.

31. A composition suitable for reaction with polyisocyanate to obtain polyurethane, and containing polyols and ureas and substantially free of primary or secondary amines, said composition produced by reacting the decomposition product of polyurethane, said decomposition product of polyurethane being produced by reacting a polyurethane foam with a decomposing agent selected from the group consisting of glycols, polyols, polyethers, amines and ammonia at elevated temperature ranging from about 100° to about 300° C., said decomposition product containing polyols, ureas and amines containing active hydrogen, with an alkylene oxide at elevated temperature and pressure, and converting said amines to polyols.

32. The composition as defined in claim 31, employing a glycol as decomposing agent at elevated temperature ranging from about 150° to about 250° C.

33. The composition as defined in claim 31, employing ammonia or concentrated ammonium hydroxide as decomposing agent, in a solvent selected from a group consisting of a glycol, polyol and polyether at temperature ranging from about 150° to about 250° C., the concentration of ammonia or ammonium hydroxide ranging from about 0.1 to about 40% by weight of solution, the proportion of ammonia or ammonium hydroxide to polyurethane ranging from about 0.1 to about 30% by weight, said decomposition product containing a member selected from the group consisting of primary and secondary amines, and mixtures thereof, and employing an excess of alkylene oxide ranging from more than 1 to about 3 moles of alkylene oxide per mole of active hydrogen atom of the amines, said alkylene oxide selected from the group consisting of ethylene oxide, propylene oxide, butylene oxide, pentene oxide, hexylene oxide, cyclohexene oxide, styrene oxide, epichlorohydren and trichlorobutylene oxide, said temperature of reaction with alkylene oxide ranging from about 120° to about 140° C. at autogenous pressure ranging from about 25 to about 200 psi.

* * * * *